United States Patent
Chen

(10) Patent No.: US 7,239,806 B2
(45) Date of Patent: Jul. 3, 2007

(54) SLIDING COVER

(75) Inventor: Yi Yuan Chen, Hsinchu (TW)

(73) Assignee: Premier Image Technology Corporation, Taipei (TW)

( * ) Notice: Subject to any disclaimer, the term of this patent is extended or adjusted under 35 U.S.C. 154(b) by 70 days.

(21) Appl. No.: 11/004,848

(22) Filed: Dec. 7, 2004

(65) Prior Publication Data
US 2006/0056838 A1 Mar. 16, 2006

(30) Foreign Application Priority Data
Sep. 10, 2004 (TW) .............................. 93214537 U

(51) Int. Cl.
*G03B 7/26* (2006.01)
*G03B 13/02* (2006.01)
*G03B 17/02* (2006.01)

(52) U.S. Cl. ...................... 396/301; 396/376; 396/448; 396/542

(58) Field of Classification Search ................ 396/448, 396/376, 301, 542
See application file for complete search history.

(56) References Cited

U.S. PATENT DOCUMENTS

| | | | | |
|---|---|---|---|---|
| 2,918,333 A | * | 12/1959 | Friedman | 384/53 |
| 3,224,326 A | * | 12/1965 | Brownscombe | 353/76 |
| 4,019,192 A | * | 4/1977 | Miyagawa | 396/349 |
| 4,025,930 A | * | 5/1977 | Wolff | 396/29 |
| 4,560,261 A | * | 12/1985 | Ueda et al. | 396/336 |
| 5,878,292 A | * | 3/1999 | Bell et al. | 396/312 |
| 6,347,893 B1 | * | 2/2002 | Shiono et al. | 396/448 |
| 6,450,708 B1 | * | 9/2002 | Takanashi | 396/448 |

* cited by examiner

*Primary Examiner*—W. B. Perkey
(74) *Attorney, Agent, or Firm*—Birch, Stewart, Kolasch & Birch, LLP

(57) ABSTRACT

A sliding cover for protecting camera lens and switching the power of the camera, comprising a cover plate and a permanent magnet. The cover plate is slideably connected with the front shell of the camera, a magnetic induction switch is installed at the inner side of the front shell. Furthermore, the permanent magnet is connected to the cover plate, when the lens is exposed while the cover plate is sliding away, the permanent magnet will then be close to the inducible switch and switch the power automatically. For sliding smooth, a few pads with low friction coefficient and wear-resistant property can be installed between the cover plate and the front shell of the camera; preferably, the inner side of the of the cover plate can further installed a rolling wheel to smooth the sliding and prevent scratch on the front shell surface when been highly pressed.

11 Claims, 4 Drawing Sheets

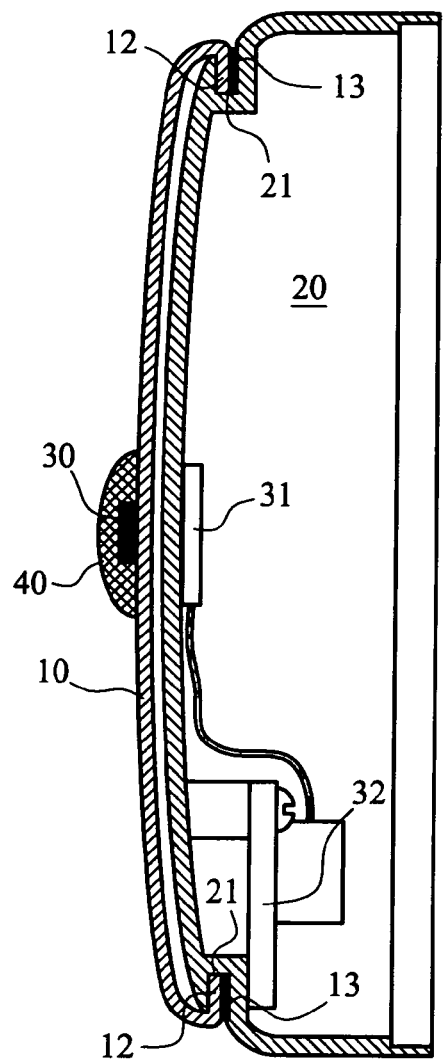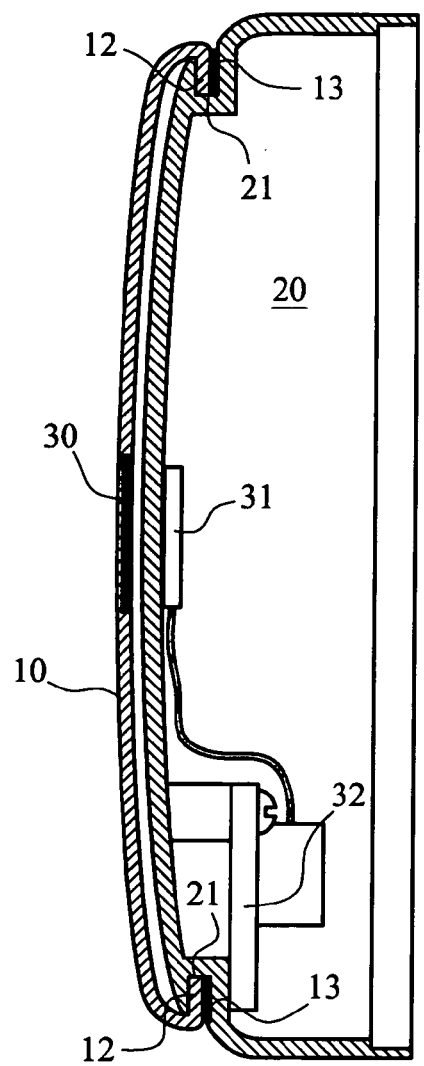
FIG.6　　FIG.7
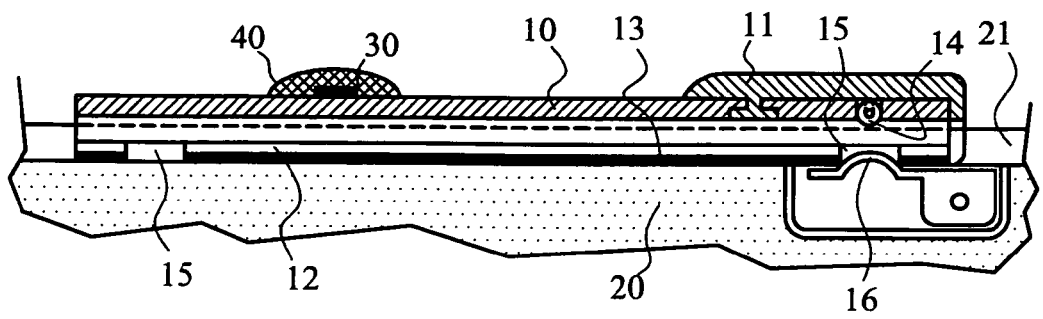
FIG.8

SLIDING COVER

FIELD OF THE INVENTION

The present invention relates to a cover structure for protecting camera lens; and, more specifically, to a sliding cover which can switch power without real contact.

BACKGROUND OF THE INVENTION

Although most of the sliding covers are installed for protecting camera lens, there are diversities of structural innovation created one after another by manufacturers; for instance, U.S. Pat. No. 4,557,574, U.S. Pat. No. 6,257,776, U.S. Pat. No. 6,264,378, U.S. Pat. No. 6,322,259 and U.S. Pat. No. 6,491,448, the cover is a box-like cover plate, is connected to the equipment body. When taking the pictures, the user can telescopically slide the box-like cover plate to reveal the lens. The box-like cover plate can further be equipped with some operation buttons or components such as flash light, connected to the PCB inside the camera through flexible PCB or cable. The structure is complicated and the assembly is difficult.

Other patent related sliding cover, such as U.S. Pat. Nos. 4,240,735, 4,522,478, 5,805,947, the sliding cover equipped with simple shelter function, but not none of them has function to switch the operation power of the camera. Some other sliding cover, disclosed in U.S. Pat. Nos. 5,819,127, 5,892,996, 6,079,883, 6,424,803, etc., have provided a sliding cover which having slots on the back of the sliding cover to trigger some tiny components, however, it is a complicate structure and difficult to assemble the same.

It is said, that OLYMPUS™ Corporation may probably be the first company utilizing a sliding cover to control the power switch. Inside, the sliding cover, a leaf-like switch component is installed for touching the start and end point; meanwhile, a compressed spring and a plurality of steel balls are buried to be used as clicking element. Since components are buried, the sliding cover is thus getting thicker. Moreover, if the outer surface of the sliding cover is not treated with painting, the buried components will be exposed and affect its appearance. The structure of the sliding cover in the present invention is simple, easy to assemble and may save the cost.

SUMMARY OF THE INVENTION

To surmount the above-mentioned drawbacks, the inventor of the present invention therefore study carefully to improve the structure. Through the studies, a sliding cover structure according to the present invention is then provided.

The object of the present invention is to provide a sliding cover, which is simple in structure, with less components, low cost, and easy to assemble, for protecting the camera lens. Meanwhile, the sliding cover is able to control the camera power through induction method.

The sliding cover of the present invention is to protect the camera lens and wirelessly switch the power of camera. The sliding cover comprise a cover plate and a permanent magnet, wherein the cover plate is slideably engaged with the front shell of the camera in a slideable way; moreover, a magnetic induction switch is mounted at the inner surface of the front shell. Permanent magnet is connected to the cover plate. When the cover plate slides away, it will make the permanent magnet stay within the inductive range of the magnetic induction switch; therefore, the camera power can be switched automatically and wirelessly. In order to reduce the sliding resistance, a space is attached between the cover plate and the front shell of the camera, preferably, the space can be of some wear-resistant material with low friction coefficients; in more better embodiment, the inner surface of the cover plate can further be installed with rolling wheel in order to smooth the sliding action between them and avoid scratch on the front shell while been highly pressed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The foregoing description or other characteristics, objects, features and advantages of the present invention will become more apparent upon consideration of the following detailed description, having reference to the accompanying drawings wherein;

FIG. 3 is an elevational view illustrating the first embodiment of the present invention, showing the sliding cover position when the power is turned on.

FIG. 5 is an elevational view illustrating the second embodiment of the present invention, showing the sliding cover position when the power is turned on.

FIG. 6 is an cross-sectional view illustrating the second embodiment of the present invention.

FIG. 7 is an cross-sectional view illustrating the third embodiment of the present invention.

FIG. 8 is an cross-sectional view illustrating the fourth embodiment of the present invention.

DETAILED DESCRIPTION OF THE PREFERRED EMBODIMENTS

Figure 1:
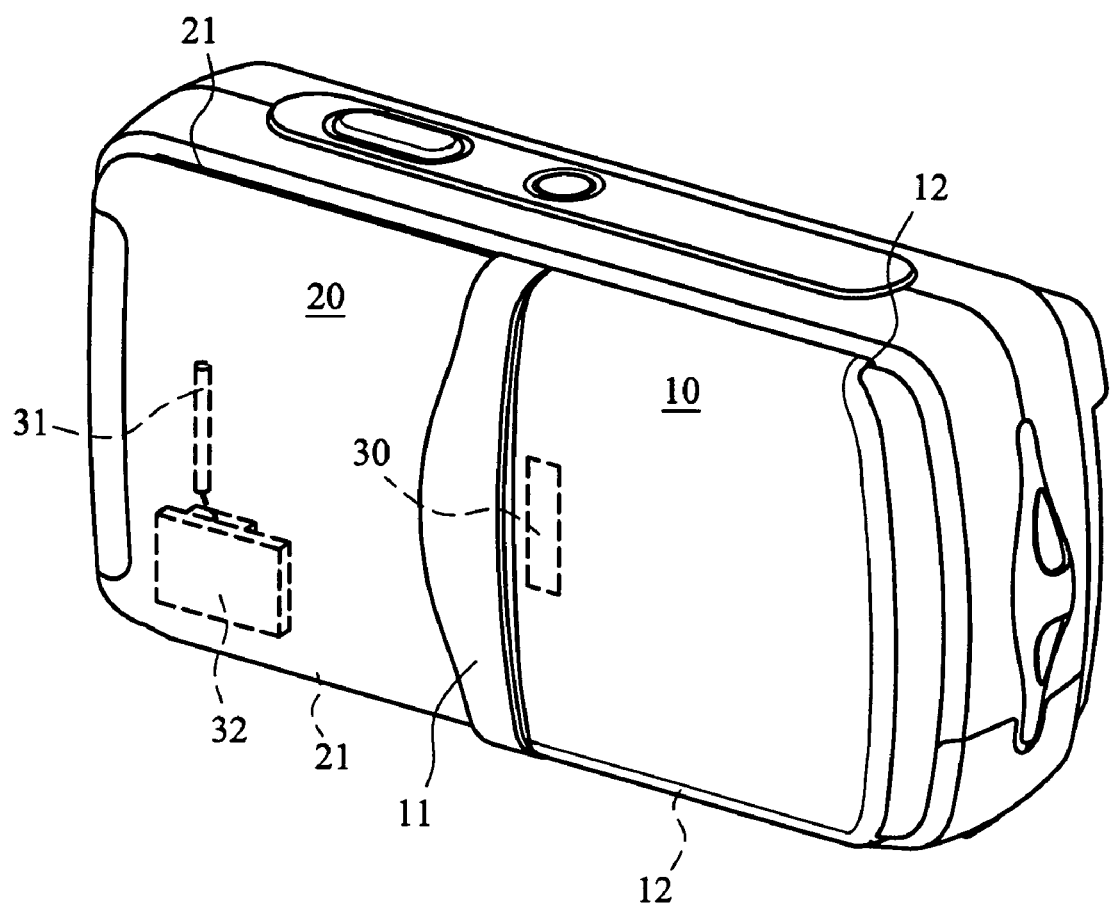
FIG. 1 is a perspective view illustrating the sliding cover and the front shell of the camera in accordance with the present invention.

First of all, referring to FIG. 1, an embodiment of sliding cover (10) according to the present invention is slideably connected to the front shell (20) of the camera. The front shell (20) has a pair of sliding slots (21) used to slideably engaged with hook flanges (12) of the sliding cover (10), the inner surface of the front shell (20) is installed with a magnetic induction switch (31) connected with a printed circuit board (32) for switching the power of camera. A permanent magnet (30) is fixed on the sliding cover (10), for instance, hidden or embedded within the sliding cover (10). When the sliding cover (10) is slid to expose the camera lens, the permanent magnet (30) will close to the inductive range of the magnetic induction switch (31) to turn on the power circuit.

Figure 2:
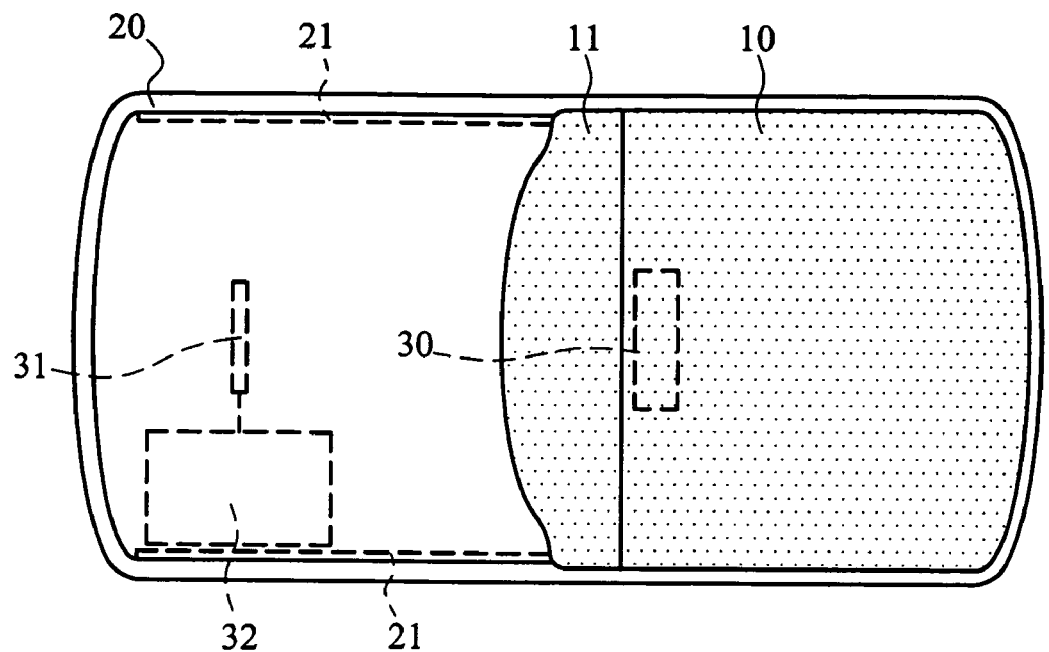
FIG. 2 is an elevational view illustrating the first embodiment of the present invention, showing the sliding cover position when the power is turned off.
Figure 3:
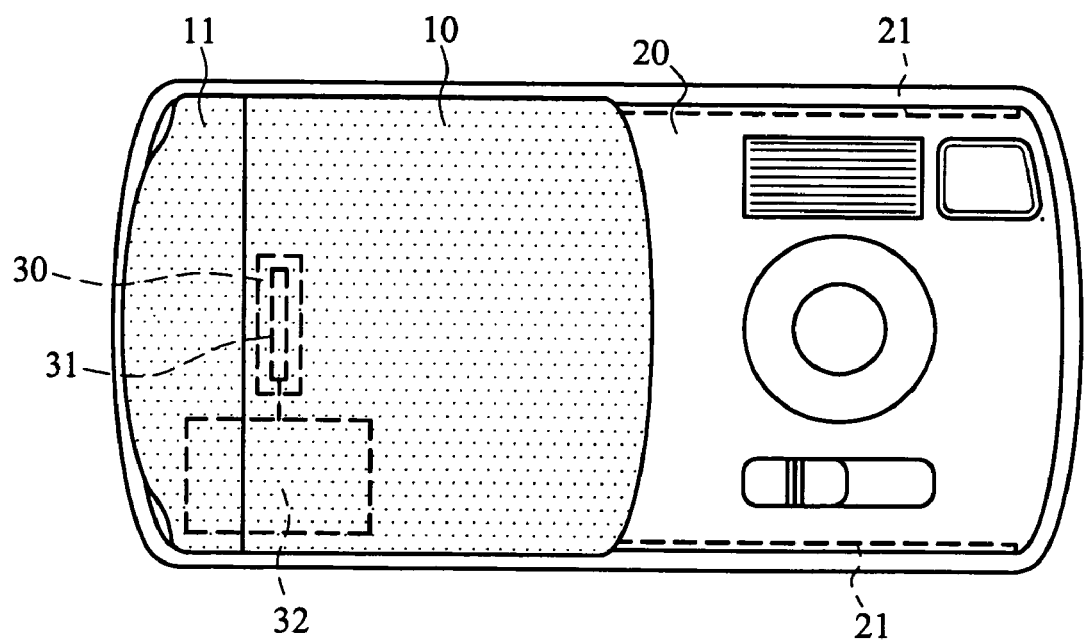

Referring to FIGS. 2 and 3. To improve the convenience for the camera users, the sliding cover (10) may further to comprise a push element (11) formed as a protrusion on the side of the sliding cover (10), such that the users can use their thumb or other fingers to control the sliding cover (10). As shown, while the sliding cover (10) is closed, the position of the permanent magnet (30) will move in the induction range of the magnetic induction switch (31) and switched off the power of the camera. Again, when the sliding cover (10) is opened to expose the camera lens, will then makes the permanent magnet (30) to enter the induction range of the magnetic induction switch (31) and turns on the power of the camera.

Figure 4:
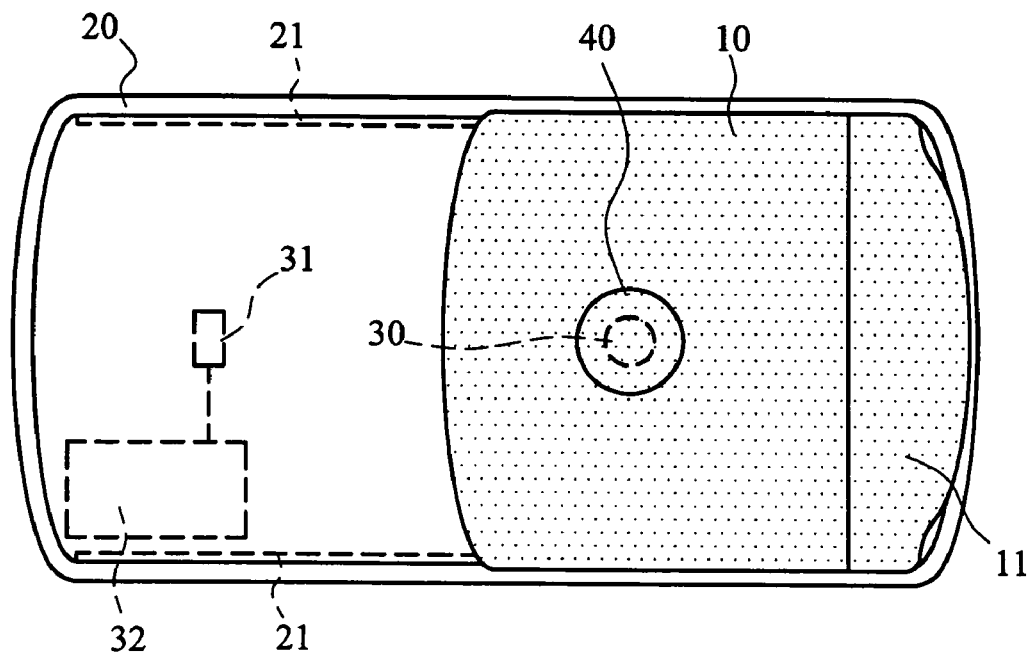
FIG. 4 is an elevational view illustrating the second embodiment of the present invention, showing the sliding cover position when the power is turned off.
Figure 5:
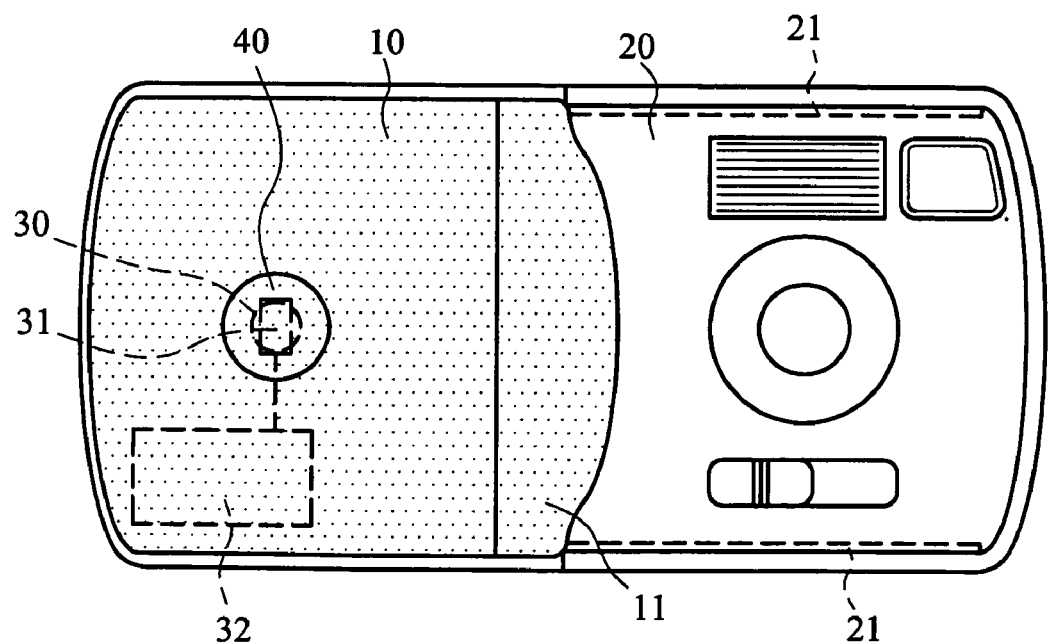

In view of the cameras now available in the market, none of them are equipped with transparent sliding cover (10), to create a fresh style. However, the sliding cover (10) in accordance with the present invention is suitable to adopt some of transparent or semi-transparent plastic material. Further refer to FIG. 4 and FIG. 5 for another embodiment, sliding cover (10) may further to comprise a self-photo mirror (40) or a decorative part to hide the permanent magnet (30). The operation principle of this embodiment could be the same of the above embodiment. Magnetic induction switch (31) could be a solenoid switch which is available in the market, or it could be an ordinary magnetic controlled IC.

Please further to refer FIG.6 and FIG.7. Preferably, to reduce potential sliding resistance and smooth the sliding between sliding cover (10) and the front shell (20) of camera, the sliding cover (10) may further equipped with several pads (13) made of low friction coefficient and wear-resistant material; for instance, a thin piece of Teflon™, Nynon™ or engineering plastic.

Preferably, as shown in FIG. 8, a rolling wheel (14) can be further installed on the inner surface of the sliding cover (10) to smooth the sliding between them and to avoid the scratch on the surface of the front shell (20) when the push element (11) is highly pressed. To create the clicking feeling of the sliding cover (10), a spring (15) can be installed at the front shell (20) of the camera and make it be inserted into the sliding slot (21); in the mean time, a notch (15) corresponding to the closed state of a sliding cover (10) is created at the hook flanges (12) of the sliding cover (10), making the notch slide inside the sliding slot (21) to a full close or full open position for the insertion of spring (15); therefore, the clicking feeling would be generated while the sliding cover (10) is in a position of full open or full close.

Therefore, the present invention has advantages compared to the prior art; for example, it simply in the sliding cover structure, and can wirelessly control the power of the camera. Obviously, the present invention has provided a novel structure suitable for low cost mass production and assembly. However, the above description is intended to provide specific examples of individual embodiments for clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

I claim:

1. A sliding cover for protecting a camera lens, the sliding cover being slideably engaged with a front shell of a camera, the front shell having a pair of sliding slots and an induction switch used to control the power of the camera, the sliding cover comprising:
    a cover plate for protecting the lens, the cover being equipped with a self-photo mirror;
    a permanent magnet fixed on the cover plate for switching the induction switch; and
    a plurality of hook flanges extended from the cover plate and slideably connected to the sliding slot.

2. The sliding cover in accordance with claim 1, wherein the cover plate is made of a transparent material.

3. The sliding cover in accordance with claim 1, wherein the cover plate is made of a semi-transparent material.

4. The sliding cover in accordance with claim 1, wherein the permanent magnet is hidden inside the cover plate of the sliding cover.

5. The sliding cover in accordance with claim 1, wherein the permanent magnet is installed at a location that the permanent magnet can affect the magnetic induction switch when the sliding cover slides away to expose the camera lens.

6. The sliding cover in accordance with claim 1, wherein the self-photo mirror hides the permanent magnet.

7. The sliding cover in accordance with claim 1, wherein the hook flanges of the sliding cover further connect a wear-resistant and low friction coefficient material for reducing the friction resistance during sliding.

8. The sliding cover in accordance with claim 1, wherein the hook flanges of the sliding cover connect a thin piece of material with a low coefficient of friction.

9. The sliding cover in accordance with claim 1, wherein the sliding cover has a push element.

10. The sliding cover in accordance with claim 1, wherein the hook flanges of the sliding cover has a notch, and the sliding slot has a spring to engage with the notch; therefore, to provide a clicking position for the sliding cover.

11. The sliding cover in accordance with claim 1, wherein the inner surface of the sliding cover is installed with a rolling wheel to support the sliding cover.

* * * * *